Jan. 15, 1935.  W. H. WOODWARD  1,988,102
CIRCULAR SAW MACHINE
Filed April 2, 1932   4 Sheets-Sheet 1

INVENTOR
William H. Woodward
BY
J. S. Murray
ATTORNEY

Jan. 15, 1935.  W. H. WOODWARD  1,988,102
CIRCULAR SAW MACHINE
Filed April 2, 1932  4 Sheets-Sheet 3

INVENTOR
William H. Woodward
BY
J. S. Murray
ATTORNEY

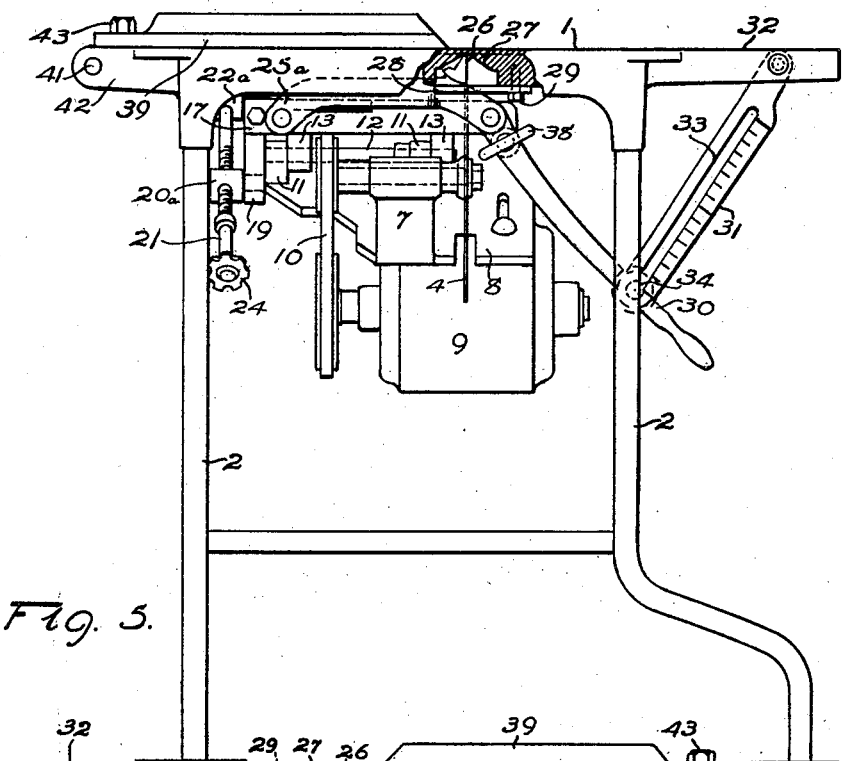
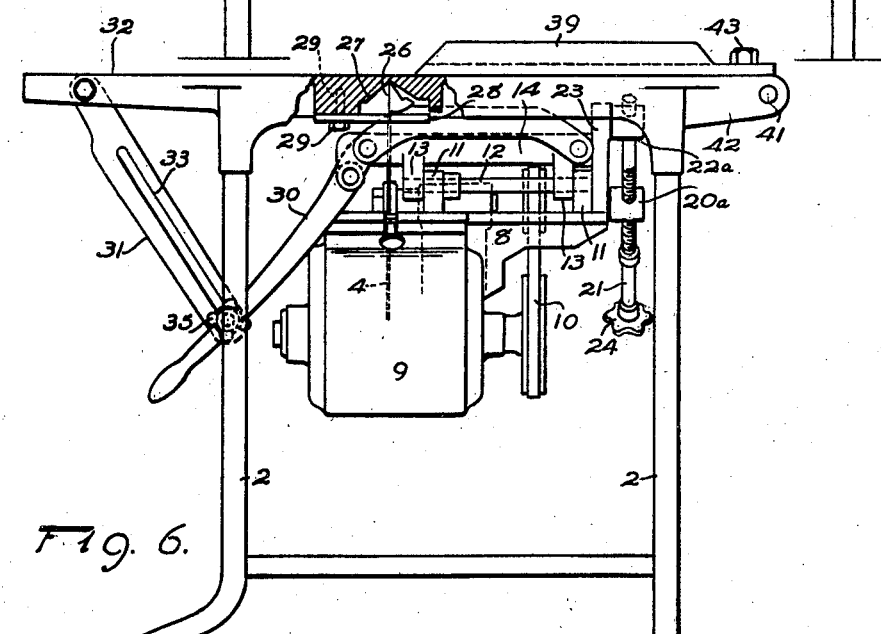

Patented Jan. 15, 1935

1,988,102

UNITED STATES PATENT OFFICE 1,988,102

CIRCULAR SAW MACHINE

William H. Woodward, Detroit, Mich.

Application April 2, 1932, Serial No. 602,747

14 Claims. (Cl. 143—36)

This invention relates to circular saw machines and particularly to saw-adjusting mechanisms for such machines.

An object of the invention is to form the table of a circular saw machine with a slot through which the saw blade may project, and to adapt the saw to tilt laterally in said slot for establishing selective cutting angles of said blade, while locating the axis of such tilting in substantial alignment with said slot, whereby the requisite width of the slot is not materially increased by the provision for such tilting.

Another object is to adapt a circular saw for adjustment at a selective inclination to a work table, about an axis fixed in close proximity to the top face of said table, while affording said saw a vertical adjustment controlling the extent to which said saw projects above said table.

Still another object is to adapt a unit comprising a circular saw and its drive motor to be adjusted selectively about either of two relatively transverse axes, raising and lowering the saw through the aforesaid slot by one of said adjustments, and establishing selective angular working positions of the saw by the other adjustment.

A further object is to adapt a circular saw machine to be operated either by feeding the work to the saw or pulling the saw through the work.

A further object is to provide a circular saw machine with elongated guides along which the saw and its drive motor may slide as a unit to feed the saw to the work or vary the working space in front of the saw, and to adapt said guides to be tilted about an axis parallel to the direction of sliding travel, for selectively varying the cutting angle of the saw, in any position of such sliding travel.

A further object is to adapt a work-positioning arm to either undergo a sliding travel for feeding the work to the saw, or to be clamped to the saw table so as to hold the work fixed while the saw is fed through it.

A further object is to provide for adjustment of said arm such as to position the work for cutting at a right angle to its length or at a selective acute angle to its length.

A further object is to adapt said arm to be readily swung to a position entirely clear of the table top to allow a free feeding to the saw of work requiring no accurate positioning.

These and various other objects the invention attains by the construction hereinafter described, and illustrated in the accompanying drawings, wherein:

Fig. 5 is another elevational view of the front end of the machine, showing the saw in a lowered vertical position.

Fig. 6 is an elevational view of the rear end of the machine, a portion of the frame being broken away to sectionally disclose its engagement by the other of said paired pivot bearings.

Figure 1:
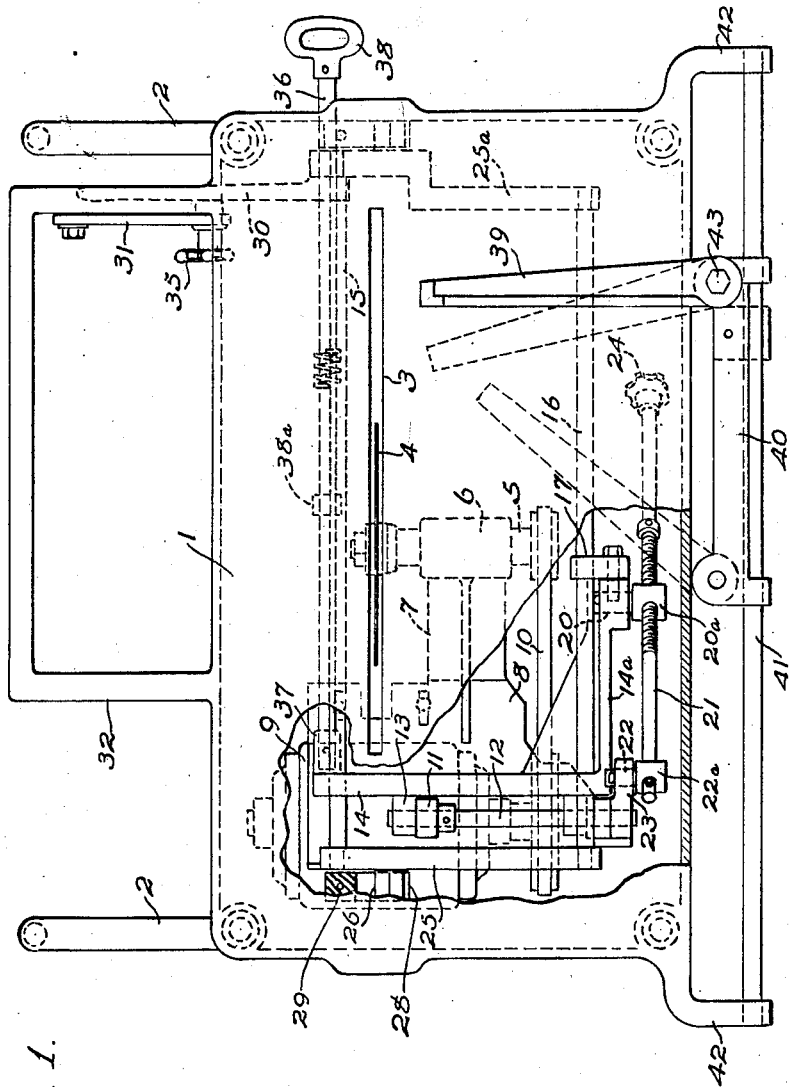
Fig. 1 is a top plan view of the herein-disclosed machine, a portion of the table thereof being broken away to show underlying parts.

In these views, the reference character 1 designates the metal table of a saw machine, which table is suitably elevated by legs 2.

Longitudinally extending in said table is a narrow elongated slot 3 through which a circular saw blade 4 is adapted to regulably project. Said blade is fast on a shaft 5 journaled in a bearing 6 terminally carried by an arm 7, projecting toward the front end of the machine from a plate 8, with which said arm is preferably integral. Secured to said plate therebeneath is an electric motor 9, from which the saw shaft is driven through a belt or cord 10.

Upwardly projecting from the plate 8, adjacent to its rear end, is a pair of spaced lugs 11, serving to pivot said plate and the parts carried thereby on a shaft 12. The latter is mounted transversely of the machine in a pair of spaced lugs 13, integrally projecting rearwardly from a member 14 of a carrier 14, 14a mounted to slide longitudinally of the machine on a pair of spaced horizontal rods 15 and 16. The member 14 is bridged across and terminally engaged with the rods 15 and 16, and the member 14a projects forwardly from the member 14 adjacent to the rod 16 and carries at its forward end a slide bearing 17 engaging the last mentioned rod.

Integrally depending from the front end of the member 14a is an arm 19, upon the lower end of which is swivelled a pin 20 having diametrically threaded in its head 20a the intermediate portion of an adjusting screw 21. The rear end of said screw is diametrically journaled in the head 22a of a pin 22, swivelly mounted in the upper end of a standard 23 integrally rising from the plate 8. The forward end of the screw 21 carries a suitable handle 24 whereby said screw may be rotated to adjust it forward and back in the head 20a to rock the plate 8 and the parts carried thereby upon the shaft 12.

Figure 2:
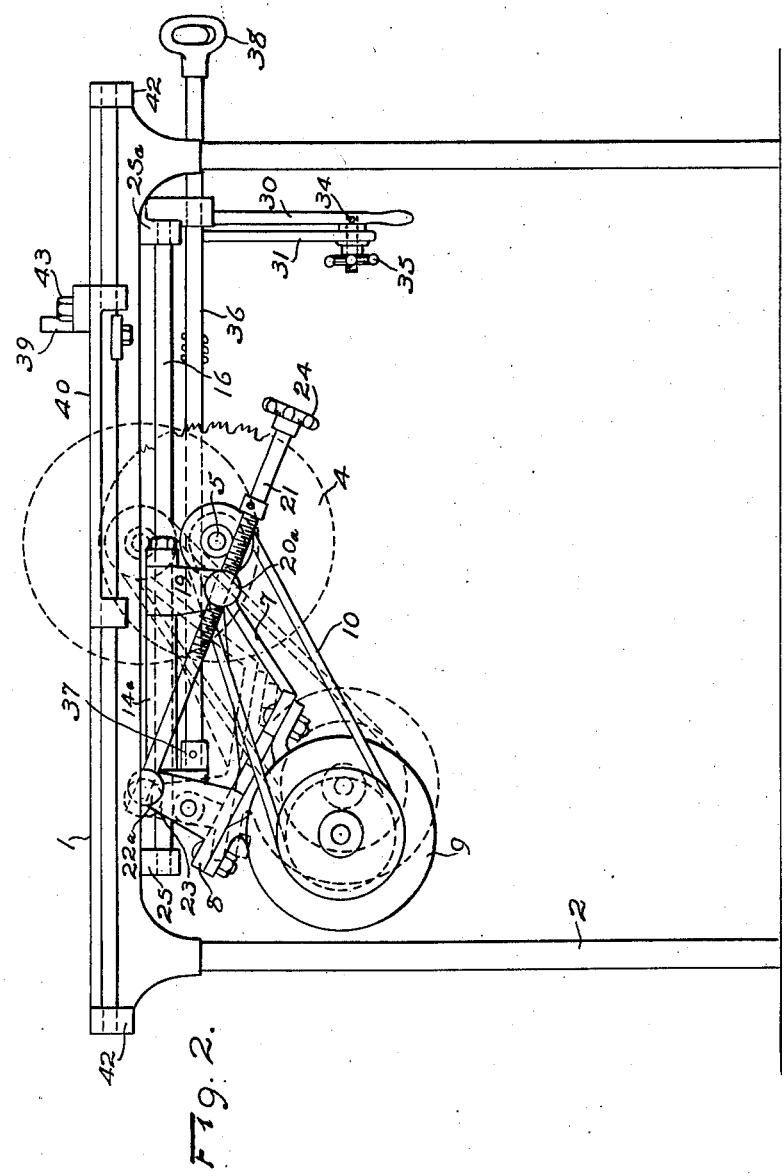
Fig. 2 is a side view of the described machine, showing in full and in dash lines alternative positions of vertical adjustment of the saw.
Figure 3:
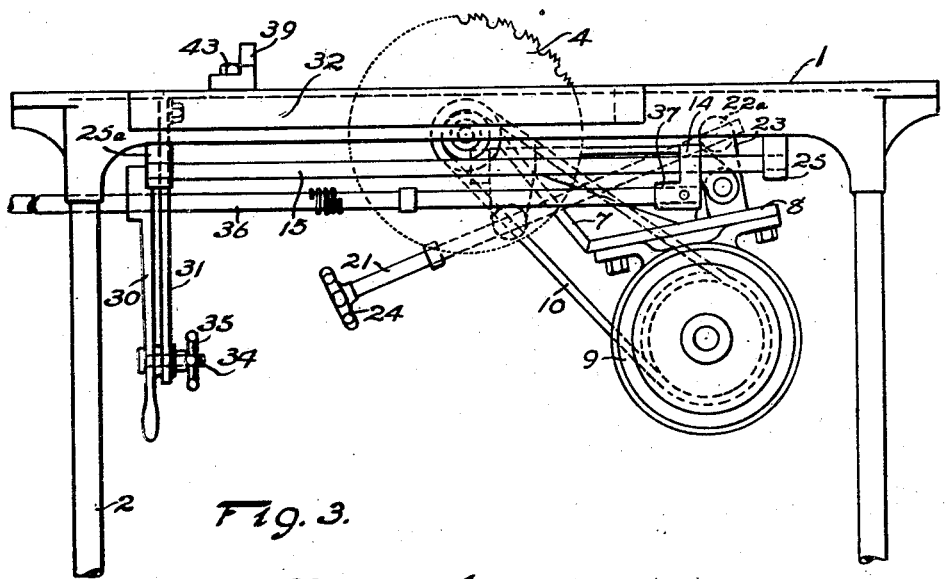
Fig. 3 is a view in elevation of the other side of the machine.

Thus it is seen that the saw 4 together with its drive motor 9, and the member 6, 7, 8 carrying said saw and motor, constitute a unit pivotally adjustable on the shaft 12 to raise and lower the saw. In Fig. 2 there is shown in dash lines a limiting raised position of such adjustment, while in full lines the unit is shown lowered to position the saw substantially beneath the table 1. It is to be noted that the standard 23 rises sufficiently above the shaft 12 to afford the screw 21 adequate leverage for adjusting the aforementioned unit pivotally upon said shaft.

It is further to be noted that the saw and its supporting arm are more or less counterbalanced by the motor by mounting the unit as described.

The extremities of the slide rods 15 and 16 are rigidly connected by a pair of yoke bars 25 and 25a, each integrally carrying a knife edge pivot block 26. Said blocks are so located on the described yoke bars that their pivot edges establish an axis passing through the saw, in its plane of rotation. Said edges bear upwardly against the bottom face of the table in a pair of shallow V-shaped notches 27 formed in said face and located to establish the knife edge pivot axis in substantial alignment with the slot 3, and hence in the approximate plane of the top face of the table 1. For holding said pivot blocks in the described engagement with the table, and thus supporting all of the described adjustable parts, a pair of spring plates 28 are bolted at corresponding ends to the under face of the table top, as indicated at 29, their other (or free) extremities engaging beneath said blocks. The under faces of the pivot blocks are arcuately curved, as best appears in Figs. 5 and 6, to rest and turn upon the plates 28 during tilting of the described mechanism about the knife edges.

For establishing and maintaining a selective tilted position of the described mechanism about the knife edge axis, a lever 30 is rigidly connected to the yoke bar 25a, and projects laterally from said bar at a downward inclination, being adjustably engaged at an intermediate point thereof with the lower extremity of a swinging link 31 pivoted upon a lateral extension 32 of the table top. Preferably, the link 31 is longitudinally slotted as indicated at 33, and a pin 34 carried by the lever projects freely through the slot 33 and is terminally engaged by a hand nut 35 adapted to clamp the link and lever in firm engagement in selective relatively angular positions. Thus, in Fig. 4, the lever 30 is shown clamped in engagement with the upper portion of the link 31, establishing the saw blade at an approximate forty-five degree inclination, while in Fig. 6 the lower extremity of said link engages the lever, maintaining the saw substantially vertical.

Figure 4:
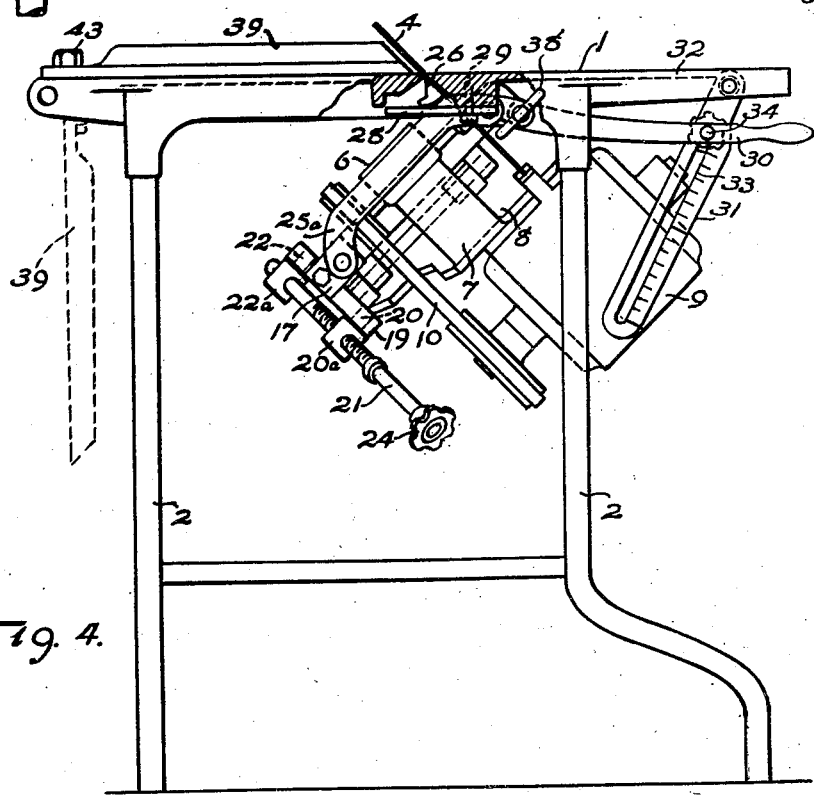
Fig. 4 is a front end view of the machine, showing the saw tilted to cut at an approximate forty-five degree angle, a portion of the frame being broken away to sectionally show one of the paired pivot bearings which provide for selective variation of the cutting angle of the saw.

Gauge markings on the link 31 may intersect the slot thereof in the longitudinally spaced relation, best shown in Figs. 4 and 5, so as to coact with the lever 30, in predetermined positions thereof to definitely indicate the angles at which the saw is tilted in such positions.

To adapt the carrier 14, 14a and the unit pivoted thereupon to be slid along the rods 15 and 16 to feed the saw through the work, a pull rod 36 has its rear end rigidly secured in a collar 37 carried by the member 14, and projects at its other extremity beyond the front end of the machine, terminally carrying an actuating handle 38, the front end portion of said pull rod being slidable in the yoke bar 25a. A set collar 38a may be fastened at any desired point on said pull rod to limit forward actuation of the saw.

In feeding the saw to the work (by means of said pull rod) or in feeding the work to the saw, it is ordinarily desirable to employ a back rest to properly position the work and establish it in a definite angular relation to the saw. Such a back rest is formed by an arm 39, adapted in use to rest on the table either transversely to the saw blade, as shown in full lines in Fig. 1, or at an angle to the blade as shown in dash lines in said figure. Said arm is attached to a mounting 40 slidable on a rod 41 positioned at one side of the table by a pair of brackets 42 projecting from the ends of the table top.

In cutting boards or strips at right angles to their length, the back rest arm is secured to the front end of the mounting 40, and is attached to the rear end of said mounting when the strips or boards are to be cut at an acute angle to their length (see Fig. 1). When cutting up work requiring no definite angle of severance, the arm 39 is preferably swung entirely clear of the table, pivoting on the rod 41, and assuming the position beneath said rod shown in dash lines in Fig. 4.

In use of the described machine for cutting strips or boards of short or moderate length, the carrier 14, 14a is initially slid to its rearmost position, established by engagement of the member 14 with the yoke 25.

The arm 39 is mounted upon the forward end or rear end of its mounting 40, according as the work is to be cut at right angles to its length or at an acute angle thereto. In the latter case, the arm may be swung about its pivotal end to the desired angular relation to the saw blade, and clamped in such position by a nut 43. The work is fed to the saw at a suitable rate by manually advancing the back rest toward the saw, such advance being permitted by sliding of the mounting 40 on the rod 41.

In sawing off long boards or strips, the weight and length thereof render their feeding to the saw inconvenient, and it is preferred to establish a fixed position of the work and its back rest and to feed the saw through the work by use of the pull rod 36. The back rest may be held in fixed position by tightening a clamping screw carried by the mounting 40 against the under face of the rod 41.

Manipulation of the screw 21 raises or lowers the saw blade so that it may project to a desired extent above the table, and manipulation of the lever 30 effects a lateral tilting of the saw to establish it at selective inclinations to the top and bottom faces of the work.

It is desirable that the slot in a saw table which accommodates the saw shall have a minimum width to prevent so far as possible, the passage through such slot of pieces of wood or the like which may clog the saw or interfere with its adjustment. By locating the tilting axis of the saw in the described machine approximately in the work-holding surface of the table, and in alinement with the slot 3, it is evident that the requisite width of said slot is not increased by the provision for tilting.

The described machine presents the advantages that it is highly compact, comparatively light, and relatively inexpensive, the requisites of a portable sawing machine thus being well satisfied.

While it is apparent that the illustrated embodiment of my invention is well calculated to adequately fulfill the objects and advantages primarily stated, it is to be understood that the invention is susceptible to variation, modification and change within the spirit and scope of the subjoined claims.

What I claim is:

1. A circular saw machine comprising a slotted table, a unit positioned beneath said table comprising a circular saw projecting through the slot of said table and a motor driving said saw, a pair of knife edge bearings mounting said unit upon the table between the extremities of said slot and the table, and pivoting the unit to tilt about an axis substantially aligned with said slot, and means for holding said unit selectively tilted about said axis.

2. A circular saw machine comprising a table formed with an elongated slot and having in its under face a pair of notches of inverted V-shape, the inclined walls of each notch meeting in substantial alignment with said slot, a unit positioned beneath said table comprising a circular saw projecting through the slot of the table, a pair of knife edge bearing blocks carried by said unit and upwardly seating in said notches, whereby said unit is adapted to tilt about said bearings, means retaining said blocks engaged with said notches, and means for holding said unit in selective positions of its tilting travel.

3. A circular saw machine comprising a slotted table, a unit positioned beneath said table comprising a circular saw projecting through the slot of the table and a motor driving said saw, a pivotal support for said unit adapting the saw to be raised or lowered in said slot, means for holding the unit in selective pivotal positions on said support, a pair of knife edge bearings pivoting said support upon the table in substantial alignment with said slot and between the extremities of the slot and table, and means for holding said support selectively adjusted about the axis established by said knife edge bearings.

4. A saw machine, comprising a slotted table, a unit positioned beneath said table comprising a saw extending through the slot of said table and a drive element for said saw, a pair of knife edge bearings carried by said unit, each having its sides upwardly converging to its knife edge, members carried by said table having line contact with said knife edges, and establishing a pivot axis for said unit, substantially aligned with said slot, and means exerting an upward pressure upon said bearings maintaining the specified line contact.

5. A saw machine, as set forth in claim 4, said means exerting upward pressure consisting of leaf springs carried by said table therebeneath and engaged beneath and stressed upwardly against said knife edge bearing members.

6. A circular saw machine comprising a table having an elongated slot, a frame pivoted upon the table therebeneath to turn about an axis parallel to said slot, said frame being elongated in parallelism with said slot, a carrier longitudinally slidable upon said frame, a unit mounted upon said carrier comprising a circular saw, upwardly projecting through said slot and a motor driving the saw, means for adjusting said unit upon the carrier to raise or lower the saw through said slot, a lever rigidly projecting from said frame transversely to its length for swinging said frame on its pivotal axis, and means carried by said table and coacting with said lever to hold the frame selectively pivotally adjusted, said lever projecting beyond the last named means to form an operating handle.

7. A circular saw machine, comprising a table having an elongated slot, a carrier slidable upon said table, therebeneath, lengthwise of said slot, a unit comprising a circular saw projecting upwardly through said slot and a motor driving the saw, means pivoting said unit upon the carrier to turn about an axis transverse to said slot and located above said motor, whereby the saw may be raised or lowered in said slot with minimum effort, an adjusting screw having a swivel connection to said unit at a point above the pivotal connection of the unit to the carrier, the axis of said swivel connection being parallel to said pivotal connection and transverse to said screw, and a nut, swiveled upon the carrier about an axis parallel to that of said swivel connection and engaged by an intermediate threaded portion of said adjusting screw.

8. In a circular saw machine, a work table, an elongated frame pivoted upon said table to tilt about an axis longitudinal of said frame, a carrier longitudinally slidable upon said frame, a pull rod for actuating sliding travel of said carrier, a unit comprising a circular saw and its drive motor, means pivoting said unit upon said carrier and about an axis transverse to the direction of sliding of the carrier, and means engaging said pull rod for locking said carrier against sliding travel.

9. A saw machine comprising a slotted table member, a frame member beneath said table member, a pair of knife edge bearings mounting one of said members upon the other between the margin of the table member and the extremities of the slot in said member, said bearings pivoting the member so mounted to tilt about an axis substantially aligned with said slot, means for holding the last mentioned member selectively tilted about said axis, a saw working in said slot, means for operatively mounting said saw upon said frame member, and drive means for said saw.

10. A saw machine comprising a table member formed with a slot and having in its under face a pair of notches of inverted V-shape, the inclined walls of each slot meeting in substantial alignment with said slot, a frame member beneath said table member, a pair of knife edge bearing blocks upwardly seating in said notches, whereby one of said members is adapted to tilt relative to the other about said line as an axis, means retaining said blocks engaged in said notches, means for holding the tilting member selectively tilted, a saw working in said slot, means mounting said saw upon said frame member, and drive means for said saw.

11. A circular saw machine comprising a slotted table member, a unit positioned beneath said table member and comprising a circular saw projecting through the slot of said table member and a motor driving said saw, a supporting member whereon said unit is pivoted to adapt said saw to be raised and lowered in said slot, means for holding the unit in selective pivotal positions on said supporting member, a pair of knife edge bearings pivoting one of said table and supporting members on the other, between the extremities of the slot and table member, to turn about an axis substantially aligned with said slot, and means for holding the member so pivoted selectively adjusted about said axis.

12. In a circular saw machine, a work table and an elongated frame, one thereof being pivoted on the other to tilt about an axis longitudinal of said frame, a carrier longitudinally slidable upon said frame, a pull rod for actuating sliding travel of said carrier, a unit comprising a circular saw and its drive motor, means pivoting said unit upon said carrier to turn about an axis transverse to the direction of sliding of the carrier, and means engaging said pull rod for locking said carrier against sliding travel.

13. In a saw machine, the combination with a pair of spaced guide rods and a carrier bridged across and slidable on said guide rods, of a unit pivoted on said carrier to turn about an axis transverse to said guide rods, and comprising a motor disposed substantially beneath said axis, a circular saw disposed between said guide rods, and a drive connection from said motor to said saw, and means for angularly adjusting said unit about said axis, whereby the saw is adjustable up and down between the guide rods, while corresponding movement of the motor is substantially horizontal.

14. In a saw machine, the combination with a pair of spaced guide rods and a carrier bridged across and slidable endwise on said guide rods, of a unit pivoted on said carrier at one end thereof to turn about an axis transverse to said guide rods, and comprising a motor disposed substantially beneath said axis, a circular saw disposed between said guide rods, and a drive connection from said motor to said saw, and a member for selectively adjusting said unit about said axis, engaging the unit at a point substantially above said axis and extending beyond and engaging the end of the carrier remote from said axis.

WILLIAM H. WOODWARD.